United States Patent Office 3,207,777
Patented Sept. 21, 1965

3,207,777
POLYCARBONATES OF POLYHYDROXY-
PERCHLOROBIPHENYLS
Laszlo Szobel, Grenoble, France, assignor to Societe d'
Electro-Chimie, d'Electro-Metallurgie et des Acieries
Electriques d'Ugine, Paris, France, a corporation of
France
No Drawing. Filed Oct. 30, 1962, Ser. No. 234,247
Claims priority, application France, Nov. 2, 1961, 877,739
2 Claims. (Cl. 260—463)

This invention relates to chlorinated polycarbonates and to a method for preparation of same.

Polycarbonates form a relatively new group of plastic materials and are obtained either by an ester exchange between biphenyl carbonate and 2,2-bis-4-hydroxy-phenyl-propane, or by the action under proper conditions of phosgene on the di-hydroxy di-aryl alkanes, and on bisphenol A in particular.

It is known that a certain number of attempts have been made to introduce halogen groups into the polycarbonates in order to increase their self-extinguishability properties.

The French Patent 1,152,155 of March 23, 1956, deals with the preparation of the polycarbonates from dihydroxy biphenyl sulphones and specifies that the aryl radical can carry halogen groups but discloses that these halogen groups are not capable of reacting during the conversion into polycarbonates.

In the case of the British Patent 839,858 of July 5, 1956, polycarbonates are prepared by transesterification between the bis(4-hydroxyphenyl)-dimethyl-methane and the biphenyl carbonate. It is stated that the biphenyl carbonate may be replaced by its alkylated or halogenated derivatives.

In the British Patent 653,489 of October 22, 1948, relating to a process for obtaining polyester with a high phosphorus content of the type

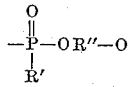

it is specified that R″ may be a chlorinated dihydroxybiphenyl. The products thus obtained are, however, costly and their uninflammability is inadequate for a great number of applications.

The present invention produces much less uninflammable polycarbonates and in much more interesting economical conditions. It relates to:

(1) Polycarbonates of the polyhydroxyperchlorobiphenyls obtained by reaction between phosgene and polyhydroxyperchlorobiphenyls having the formula

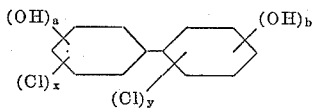

wherein the sum of $a$ and $b$ is a number from 2 to 4 and the sum of $x$ and $y$ is a number from 6 to 8.

(2) A method for obtaining said polycarbonates which comprises causing phosgene to react with polyhydroxyperchlorobiphenyls alone or in mixture with other polyhydroxy compounds, into a solvent, in the presence of a catalyst.

The polyhydroxyperchlorobiphenyls may be formed by the phenolization of decachlorobiphenyl with the aid of an alkaline agent.

The present invention is applicable to the partly phenolized compounds, that is to say, those which respectively possess 2 to 4 hydroxy groups and 8 to 6 atoms of a halogen, and more particularly to the different isomers of octochlorodihydroxybiphenyl separately or in mixture.

They may be obtained in excellent cost price conditions according to other processes which have formed the object of patent applications by the perchloration of biphenyl followed by phenolization of the latter. These products are solid, soluble in the majority of conventional solvents and decompose the solutions of alkaline carbonates.

The chlorinated polycarbonates of this invention may be prepared by the general phosgenation method, which comprises causing either phogene, process in one stage, or the corresponding bis-chloroformate ester, process in two stages, to react with a solution of polyhydroxyperchlorobiphenyls in an appropriately chosen reactive medium.

The selection of the reactive medium is important. It should as far as possible be a solvent of perchlor-biphenyls and of the products of the reaction.

In a first embodiment with octochlorodihydroxybiphenyl, for example, the phosgene is made to react with its solution in toluene and in the presence of pyridine acting as an acceptor of hydrochloric acid and as a catalyst.

In a second embodiment, the octochlorodihydroxybiphenyl is dissolved in aqueous soda, then is dispersed in a solvent such as methylene or toluene chloride. The dispersion is then subjected to phosgenation in the presence of a catalyst, for example, a quaternary ammonium salt or a tertiary amine, such as trimethylamine or triethylamine.

The phosgenation reaction is performed between 5° and 30° C. and preferably between 10° and 20° C., depending on the modus operandi adopted.

A third embodiment comprises preparing, in a first stage, the perchloro-bis-chloroformate

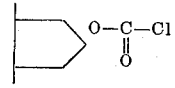

by causing a molecule of phosgene to react with one molecule of octochlorodihydroxybiphenyl which is then converted into polycarbonate by allowing it to react with another molecule of polyhydroxyperchlorobiphenyl.

In all cases, one arrives at chlorinated polycarbonates of high molecular weight but exhibiting different properties depending on the method of preparation.

The range of the products obtained can be extended considerably if instead of starting with polyhydroxyperchlorobiphenyl alone, it is utilized in a mixture with other polyhydroxy compounds.

Among these polyhydroxy compounds are:

(a) The polyhydroxybiphenyl alkanes such as, for example, the 2,2-(4,4' dihydroxybiphenyl)-propane, or the 1,1-(4,4' dihydroxybiphenyl)-cyclohexane, or else the 2,2-(4,4' dihydroxybiphenyl)-3-methylbutane, etc.

(b) The polyhydroxybiphenyls in which the linking radical between the two phenyl groups is either oxygen, sulphur or a sulphone or sulphoxide group, etc.

(c) The phenols of paragraphs (a) and (b) subject to core substitution with alkyl, acyl, alcoxy or halogen groups.

Thus, by varying the starting products, the composition of their mixtures and method of preparation, one arrives at a range of products whereof the intrinsic viscosities (measured at 25° for a concentration of 1% and less in methylene chloride), the softening points and solubilities in solvents such as methylene chloride, chloroform, dimethylformamide differ very widely.

The following examples demonstrate the process according to the invention:

Example 1

A solution was prepared of 231 parts by weight of octochlorodihydroxybiphenyl in 1000 parts of toluene to which was added 100 parts of pyridine and a very small quantity of sodium di-thionate acting as an anti-oxidant. 45.5 parts of phosgene was progressively introduced into this mixture in the course of 40 minutes.

A very viscous jellied liquid was obtained which was washed with water, then with dilute hydrochloric acid, and then with water again. It was then poured into methanol acting as an anti-solvent, under violent agitation. The polycarbonate precipitated in the form of fine grains of creamy-white color which, after filtration, were stove-dried at 100° C. The intrinsic viscosity (measured at 25° C. for a concentration of 1% or less in methylene chloride) amounted to 0.548.

The chlorine content amounted to 57.8%.

The polycarbonate thus obtained was self-extinguishing according to the A.S.T.M. D635–56T and D757–49. It lent itself to the production of parts molded by thermoplastic transformation. Sheets and films could be produced from solutions of the product in appropriate solvents such as methylene chloride.

Example 2

250 parts by weight of octochlorodihydroxybiphenyl was dissolved in a solution of soda containing 11 parts of solid soda per 330 parts of water, said soda acting as a solvent and as an acceptor of hydrochloric acid. 180 parts of water, 550 parts of toluene and a small quantity of sodium di-thionate were then added. A satisfactory dispersion was obtained by mechanical stirring, into which 30 parts of phosgene was introduced progressively. While continuing the agitation, the operation was completed by the addition of 4.5 parts of tetrabutyl-ammonium-iodide. The reaction temperature was kept between 10° and 16° C. After reacting, the organic phase containing the polycarbonate has been separated and the polycarbonate washed. As in the Example 1, the polycarbonate has been precipitated by means of methanol.

The polycarbonate was separated as previously. Its intrinsic viscosity established in the same conditions as those of Example 1 amounted to 0.532 and its technological properties were comparable to those of the preceding product.

The chlorine content amounted to 57.6%.

The polycarbonate was self-extinguishing according to A.S.T.M. D635.56T and D757–49.

I claim:

1. A polycarbonate of polyhydroxyperchlorobiphenyl obtained by the reaction between phosgene and polyhydroxyperchlorobiphenyl at a temperature between 5° C. and 30° C. in a solvent selected from the group consisting of toluene and methylene chloride in the presence of a catalyst selected from the group consisting of a quaternary ammonium salt, a tertiary amine, said polyhydroxyperchlorobiphenyl having the formula

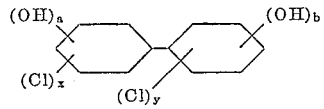

wherein the sum of $a$ and $b$ is a number from 2 to 4 and the sum of $x$ and $y$ is a number from 6 to 8.

2. The polycarbonate of claim 1 formed by reaction between phosgene and polyhydroxyperchlorobiphenyl in mixture with a polyhydroxy compound selected from the group consisting of dihydroxybiphenyl alkane, dihydroxybiphenyl, dihydroxybiphenyl sulfone, dihydroxybiphenyl ether and dihydroxybiphenyl sulfoxide.

References Cited by the Examiner

UNITED STATES PATENTS

| | | |
|---|---|---|
| 3,028,365 | 4/62 | Schnell et al. |
| 3,054,772 | 9/62 | Jibben et al. _____ 260—47 |
| 3,062,781 | 11/62 | Bottenbruch et al. _____ 260—47 |

FOREIGN PATENTS

| | | |
|---|---|---|
| 959,497 | 3/57 | Germany. |
| 1,046,311 | 12/58 | Germany. |
| 839,858 | 6/60 | Great Britain. |

OTHER REFERENCES

Schnell: Ind. Eng. Chem., vol. 51, pp. 157–160 (1959).
Schnell: Angew. Chem., vol. 68, pp. 633–640 (1956).

CHARLES B. PARKER, *Primary Examiner.*